April 27, 1954  G. R. DOUGLAS  2,677,091
PRESSURE SENSITIVE APPARATUS
Filed July 22, 1950

WITNESSES:
E. A. McCloskey
E. F. Oberheim

INVENTOR
George R. Douglas.
BY
Paul E. Friedemann
ATTORNEY

Patented Apr. 27, 1954

2,677,091

UNITED STATES PATENT OFFICE 2,677,091

PRESSURE SENSITIVE APPARATUS

George R. Douglas, Pittsburgh, Pa., assignor to Westinghouse Electric Corporation, East Pittsburgh, Pa., a corporation of Pennsylvania Application July 22, 1950, Serial No. 175,364

13 Claims. (Cl. 318—481)

1

This invention relates, generally, to apparatus responsive to physical quantities adaptable in the indication of such quantities and in the performance of certain control functions.

More in particular, this invention relates to an apparatus of the character referred to which is useful in connection with the indication of and/or the control of the speed of movement of a body in a fluid medium.

Although this invention, as hereinafter illustrated and described, is primarily useful in connection with aircraft in sensing and/or controlling aircraft speed, it will be appreciated that certain fundamental principles not related alone to the physical principles of airspeed measurement may be embodied in various types of apparatus for detecting or sensing other physical quantities.

One object of this invention is to provide a system for sensing physical quantities and/or performing predetermined control or regulation functions in response to a given physical quantity, which is simple in its elements with respect to operational requirements and positive in operation.

A further and more specific object of this invention is to provide an apparatus for sensing rates of flow of a fluid medium.

More specifically stated, it is an object of this invention to provide an improved airspeed sensitive apparatus for use on aircraft.

Yet a further object of this invention is to provide an airspeed regulating apparatus for an aircraft which, prior to connection in regulating aircraft speed, is automatically synchronized with the speed of the aircraft.

Further to the preceding object, it is also an object of this invention to provide an airspeed regulating apparatus for an aircraft which may be trimmed as desired to vary the speed of the aircraft and to hold the selected speed essentially constant.

The foregoing statements are merely illustrative of the various aims and objects of this invention. Other objects and advantages will become apparent upon a study of the following disclosure when considered in conjunction with the accompanying drawings in which.

2

Figure 2:
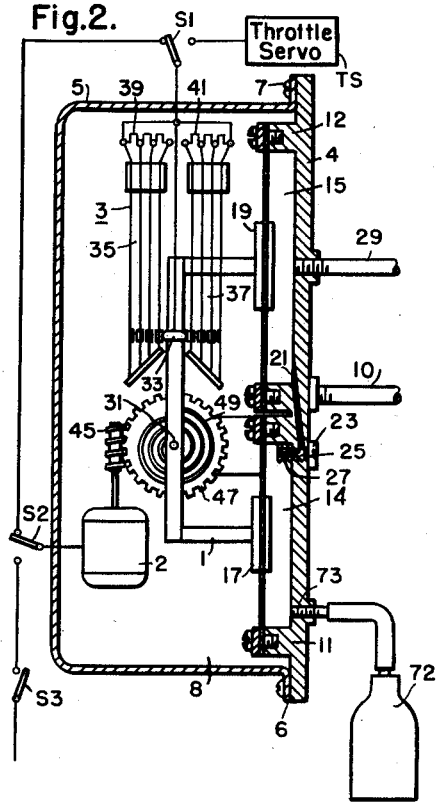
Fig. 2 is a schematic sectional-elevational view through the showing of Fig. 1.

In its general application to the measurement of physical quantities, this invention embodies a movable member designated 1 in the drawing which is biased in a counterclockwise direction as viewed in Fig. 2 in dependence of the particular physical quantity which is to be measured. This biasing effect is opposed by a counter-biasing force produced by a follow-up member generally designated 2 which is controlled by a suitable pick-off means 3 which in turn is controlled by the movements of the movable member 1. This general principle, it will be appreciated, has wide application in the measurement of various types of physical quantities, and the particular adaptation hereof in the measurement or sensing of airspeed and in the use thereof in regulating the speed of aircraft will be recognized as but one of many possible applications.

Figure 1:
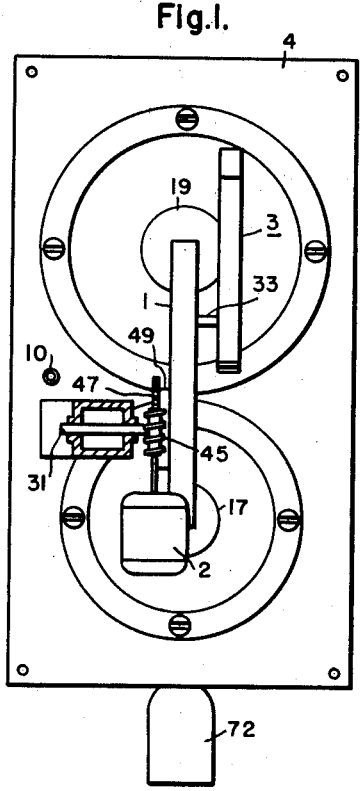
Figure 1 is a schematic illustration in plan, with the housing or cover removed and with certain parts broken away, of an airspeed sensitive device embodying the principles of this invention.

In the application of this invention to airspeed measurement the basic principle of the Pitot-static tube arrangement is utilized in detecting airspeed. To this end the present apparatus embodies a base member 4 covered by means of a housing 5 which is seated about its flanged edges at 6 to the base and suitably secured thereto by means of bolts 7 which clear through the flange on the housing 5 and threadedly engage the base 4. This arrangement defines an essentially air-tight chamber 8 between the base 4 and the housing 5 having communication with the atmosphere through a static line 10 which enters the base at one side thereof as illustrated in Fig. 1. If the apparatus is mounted in a pressurized section of the aircraft, the housing 5 should form an air-tight seal with the base 4. The base 4 comprises a pair of annular projections 11 and 12, respectively, which may be integrally formed with the base or separately attached thereto in gas-tight relation to define a pair of circular chambers 14 and 15, respectively. These chambers are each sealed over by means of flexible diaphragms 17 and 19, respectively, and are in communication with each other by means of a passage 21. This passage is formed in the base 4 between the bottom of chamber 15 and a threaded hole in the bottom of chamber 14. A capillary screw 23 having a longitudinally disposed capillary opening 27 through one end thereof and a lateral passage 25 laterally therethrough in communication with the capillary opening 27 and in registration with the passage 21 threads through the threaded hole into the chamber 14 and seals the threaded hole. The volume transfer of air between the chambers for a given pressure difference between the chambers is controlled by the capillary opening 27. Other screws having different sizes of capillary openings may be substituted to obtain the desired flow rate.

The chamber 15 is connected to the Pitot line 29 which, according to conventional practice, has a terminal end (not shown) externally of the aircraft directed into the relative wind so that a pressure is exerted on the fluid head in the line as a function of the speed of the aircraft through the atmosphere.

In operation when the speed of the aircraft is held essentially constant it will be appreciated that pressure equilibrium between the chambers 14 and 15 exists. However, upon a slight variation in speed of the aircraft, for instance if the speed should decrease, the air pressure in the airspeed chamber 15 will drop more rapidly than that in the acceleration chamber 14 and as a consequence the force per unit area exerted on the diaphragms 17 and 19 will vary, that on the acceleration diaphragm 17 being the higher of the two. Conversely, should the airspeed suddenly increase, the force per unit area on the flexible diaphragm 19 of the airspeed chamber 15 which is connected to the Pitot line 29 will be the higher of the two. The acceleration diaphragm 17 is the smaller of the two diaphragms. Hence, its total force for equal unit pressures in the two chambers 14 and 15 will be less than that of the other diaphragm 19.

These forces are converted to a movement indicative at constant aircraft speed, of the speed of the craft, and during varying speeds of the aircraft of the rate of change in the speed of the aircraft by means including the movable member 1 which may be specifically referred to as a contact arm for the purposes of this discussion. This contact arm is pivotally mounted at 31 in a pivot assembly which is secured to the base 4. It is essentially of U-shaped configuration as viewed in Figure 2 having its extremities respectively connected to the flexible diaphragms 17 and 19. The position of the pivot assembly 31 is between the ends of the contact arm, and the ratio of the lever arm connected to the diaphragm 19 with respect to the lever arm connected to the diaphragm 17 is greater than unity to afford a greater torque on the contact arm about the pivot assembly 31 due to forces exerted thereon by the diaphragm 19 than results from forces exerted thereon by the diaphragm 17 so that the movement applied to the contact arm 1 will be indicative primarily of the variation in pressure in the airspeed chamber 15.

A prod 33 is mounted on the contact arm 1 and is disposed between opposed sets of leaf contact springs 35 and 37, respectively, forming a part of the electrical pickoff generally designated 3. In this embodiment, the leaf contact springs 35 and 37 are respectively connected along spaced taps of resistor elements 39 and 41 forming part of a control circuit, which, in this illustration, is shown as a single line diagram for the purpose of simplicity.

As earlier noted in these remarks, in substance, under steady state conditions of airspeed, both diaphragms 17 and 19 "feel" the pressure due to airspeed. As a consequence the contact arm 1 is angularly displaced counterclockwise, the degree of angular displacement being proportional to airspeed and therefore indicative of the steady state airspeed. Under transient conditions, however, the instant airspeed is not indicated, the angular displacement being proportional to the rate of change of airspeed introduced by the acceleration diaphragm 17. This feature it will be observed introduces an anti-hunting sense to the system by rapidly applying large correction stimuli and by just as rapidly removing such stimuli. As thus described this device with the single stack of contacts 35, or a synchro unit responsive to angular displacement of the contact arm 1, or other suitable electrical pick-off device, may be employed to control the speed of an aircraft by introducing the voltage thereof or, as in this case the voltage across resistor 39 into a balancing network in opposition to an adjustable voltage which may be manually adjusted to different values depending upon the desired speed. The unbalanced voltage from such a network may therefore be employed to regulate a throttle servo TS shown only in block outline to maintain a preselected speed or to change the speed. In this arrangement increasing speed closes more and more of the contacts of stack 35 shunting progressively more of the resistor 39 giving a voltage variation across the resistor which is inversely proportional to the speed. Accordingly, the adjustable voltage, above mentioned, in the balancing network would be correspondingly related to speed.

It is preferred, however, in regulating the speed of the aircraft to provide a reference torque to the contact arm 1 to which the actual speed of the aircraft may be referred for comparison and regulation. To this end a follow-up member 2, which, in this instance, is in the form of a permanent magnet motor, is provided. Its permanent magnet motor is mechanically connected to the contact arm 1 by a worm 45 meshing with a worm wheel 47 which is rotatably mounted about the axis of the pivot assembly 31. Worm wheel 47 is connected to the contact arm 1 by means of a spiral spring 49, one end of which, namely, the inner end, is connected to the contact arm 1 and the outer end is connected to the worm wheel 47.

In operation prior to connection of the device to regulate aircraft speed, the permanent magnet motor is utilized as a follow-up control for maintaining a torque on the contact arm 1 which is exactly equal and opposite to the torque which results from the biasing effects of the diaphragms 17 and 19. Thus, this assembly, in effect, functions as a repeater of the instant speed of the aircraft and the device is always synchronized with the aircraft speed so that at any time in which the device is utilized to control the throttle servo TS, the speed will be maintained essentially constant at that at which the device is cut in.

In accomplishing this as diagrammatically illustrated, the permanent magnet motor 2 is connected by means of switches S1 and S2 to the electrical pick-off assembly 3. Thus, assuming the speed of the aircraft to be steadily increasing to that which is desired, it will be appreciated that the contact arm 1 will be angularly displaced in a counterclockwise direction closing certain of the contacts of the leaf spring contacts 35. The directivity sense which is imparted to the system by the opposed sets of leaf spring contacts and their control from the airspeed sensitive diaphragm arrangement effects the proper polarity of voltage application on the permanent magnet motor 2 causing rotation thereof in a direction which, for the assumed condition, will progressively increase the torque applied to the contact arm 1 by the spiral spring 49. This torque is in opposition to the torque applied by the diaphragms and is always in a direction tending to effect equilibrium between the torque due to airspeed and that due to the follow-up operation of the permanent magnet motor. Thus, it will be appreciated that the instant airspeed is, in effect, indicated in the biasing effect of the spiral spring 49, or in the angular position of worm wheel 47, and this instant airspeed is cranked into the device automatically so that the device at any instant is ready to take over and maintain the speed of the aircraft which existed at the instant of switchover.

Figure 3:
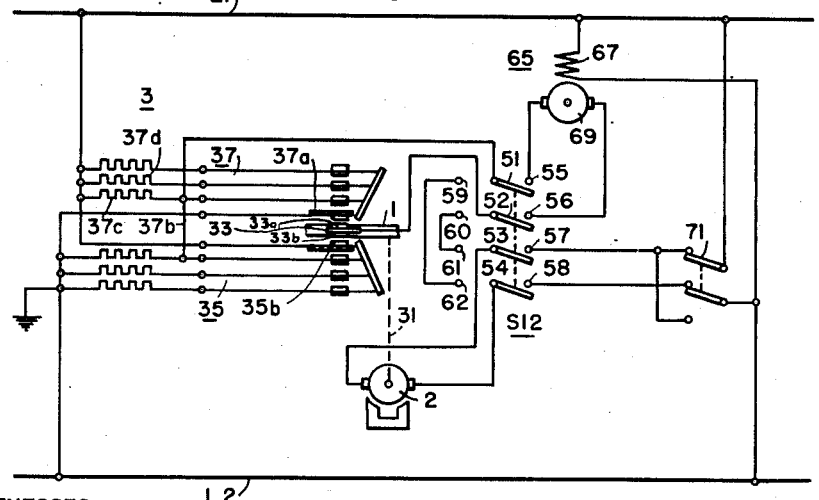
Fig. 3 is a wiring diagram of certain electrical components illustrated in Figs. 1 and 2.

A better understanding of the circuit arrangement may be had by reference to Fig. 3 illustrating the circuit diagram and a fragment of the contact arm 1. The electrical pick-off arrangement 3, being illustrated in more detail, is slightly modified to better illustrate the preferred embodiment of this invention. In this embodiment the individual leaf spring contacts of the stacks 35 and 37 are each connected in series with a resistor and are in turn connected in parallel with conductors which are respectively connected to opposite sides of the supply lines L1 and L2, leaf spring contacts 35 being connected in parallel with the line L1 and leaf spring contacts 37 being connected in parallel with the line L2. The prod 33 is illustrated as movable between a pair of leaf spring contacts 37a and 35b which are respectively insulated from the adjacent one of the contact groups 35 and 37 and are disposed to actuate the respective groups or stacks of contacts upon displacement thereof. The switches designated S1 and S2 in Fig. 2 are combined in a single switch S12 which may be a four-pole double-throw relay. This switch or relay comprises the four movable contact arms 51 through 54, a first set of stationary contacts 55 through 58 and a second set of stationary contacts 59 through 62. The movable contact elements 51 and 52 are connected, respectively, with the contacts 33a and 33b at the extremities of the prod 33 and with the inner leaf spring contacts of the respective contact groups 35 and 37. The movable contact elements 53 and 54 are connected with the armature of the permanent magnet motor 2. Contacts 60 and 61 of the left-hand stationary contact group are connected together and the contacts 59 and 62 are also connected together in this contact group. It will, therefore, be appreciated that upon movement of the movable contact elements of the switch S12 into engagement with the stationary contact group 59 through 62 that the armature 2 of the permanent magnet motor is connected in series with the electrical pick-off control 3 to be energized in dependence of the actuation thereof by means of the contact arm 1. Assuming for instance that the contact arm 1 had moved clockwise, as viewed in Fig. 2, and also Fig. 3, the prod would engage the contact adjacent thereto and cause deflection thereof to engage the adjacent leaf spring contact and, if the movement of the contact arm is sufficient to cause the said adjacent leaf contact to engage the next adjacent of the group 37. Under this condition current will flow from the line L1 through the resistor 37c to the common conductor 37b connected to the first leaf spring contact of the group 37. Since the first and second of these contacts are in engagement, current will also flow through the resistor 37d through the connected leaf spring contact to the contact end and into the contact of the first leaf spring contact and thence to the common conductor 37b thereby connecting the resistors 37c and 37d in parallel to progressively reduce the resistance in series with the conductor 37b. While only 3 sets of the leaf spring contacts on each side of the prod 33 have been illustrated, it will be appreciated that more of these may be added as is required. In practice twelve and more are employed. A circuit is now completed through the mentioned resistors and leaf spring contacts and conductor 37b to the movable contact 51 of the switch S12 to the contact 59 thereof. From the contact 59 the circuit continues to contact 62 through the movable contact 54 to one side of the armature of the permanent magnet motor 2. From the other side of this armature the circuit continues to the movable contact 53 of the switch and then to the contacts 61 and 60 connected to the movable contact 52 and thence to the contact 33a of the prod 33 to the leaf spring contact 37a and thence to the conductor L2 which completes the circuit. There is thus applied to the armature winding of the motor 2 a direct current voltage of predetermined polarity to effect rotation thereof in a direction to properly apply the spring torque to the contact arm 1. Movement of the contact arm 1 in a counterclockwise direction past its mid-position, of course, results in a reversal in the polarity of the voltage which is applied to the armature of permanent magnet motor 2 and results in a reversal in rotation thereof.

The connection just described for the permanent magnet motor 2 is that utilized when the craft is beginning its flight and prior to the time when it is desired to engage the speed regulating control of this invention to control the speed of the aircraft. As shown in Fig. 2, the aircraft is provided with a throttle servo TS which when operated increases or decreases the power developed by the propulsion system of the craft to vary the aircraft speed. This throttle servo while not detailed may include a motor 65 having a field winding 67 and an armature winding 69 which is used to operate the throttle mechanism. Upon operation of the switch S12 to a position engaging the group of stationary contacts 55 through 58, the armature 69 of the throttle servo motor 65 is connected to the electrical pickoff 3 to be energized thereby in a manner similar to the control afforded for the permanent magnet motor 2. The field 67 of the throttle servomotor is connected across the supply conductors L1 and L2.

With the switch S12 in the right-hand position just described, connections are also provided for energizing the permanent magnet motor 2 for the purpose of trimming the torque applied by this motor and its control to the contact arm 1 thereby affording a means for varying the speed of the aircraft through this medium. This is accomplished by means of a trim switch 71 which may be a three-position reversing switch (one position open switch) utilized in its two engaged positions to reverse the polarity of excitation of the armature of the permanent magnet motor 2. By means of this switch the terminals of the armature are reversely connected across the supply conductors L1 and L2.

Thus, in this second position of switch S12, should the speed of the aircraft vary from that determined by the mechanical bias on the contact arm 1, the angular displacement of the contact arm 1, under the influence of the pitot and static pressures, will result in a displacement of one of the groups of leaf spring contacts 35 or 37 resulting in excitation of the armature 69 of the motor 65 in such a direction as to change the setting of the throttle servo to either increase or decrease the speed of the aircraft to that speed which is desired. If, during the course of operation of the aircraft, it is desired to change the speed, the speed may be trimmed by means of the trim switch 71 which may be momentarily closed in one direction or the other to achieve the desired increase or decrease in speed by variation of the spring bias on contact arm 1 by motor 2 without at any time interrupting the speed regulation control. This, it will be appreciated, is of particular advantage in formation flying wherein it is desired to synchronize the speed of a plurality of aircraft with a single craft.

The acceleration chamber has been herein illustrated as an expedient for achieving acceleration response of this equipment to airspeed changes. Under certain conditions it might be felt that this additional stabilizing sense is not required in which case the acceleration chamber and that section of the contact arm 1 connected thereto may be eliminated. The size of this chamber if used will depend largely upon operational requirements. In any event it is desirable that the volume change as a result of diaphragm deflection shall represent but a small fraction of the total volume. The volume may be conveniently varied to meet various operating conditions by the simple expedient of adding a second chamber connected thereto through an opening 73 through the base into the chamber 72. The chamber herein illustrated is of the form of a bottle connected to the opening 73 by means of a tube. Such a chamber, however, may be of the form of a cup-shaped member having outwardly directed flanges which may be sealed over the opening 73 in essentially the same manner as the housing 5 is sealed on the base 4.

In some applications the region in which the airspeed sensitive device is mounted may be at true atmospheric pressure for the given flow measurement condition in which case the static chamber formed by base 4 and housing 5 is not needed in which case the housing may be eliminated.

While preferred expedients have been employed in illustrating the various structural components of this invention, it will be appreciated that numerous other conventional structural components may be substituted for those illustrated. The leaf spring contacts represent only one of many forms of electrical pick-off devices which are all well known to the art. If desired other means for introducing a mechanical bias to the contact arm 1 than the permanent magnet motor and its mechanical connections may be employed. For example, suitable electro-magnetic biasing means may be employed since the maximum angular displacements of this contact arm in practice are quite small.

Accordingly, it is intended that the foregoing disclosure and the showings made in the drawings shall be considered only as illustrative of the principles of this invention and not construed in a limiting sense.

I claim as my invention:

1. Apparatus responsive to the rate of flow of an air stream comprising, in combination, means forming a main chamber having a pair of smaller chambers therewithin, a flexible diaphragm sealing each of said smaller chambers, means for admitting atmospheric pressure to said main chamber, means for applying air pressure to one of said smaller chambers in dependence of the rate of flow of said air stream, means providing a restricted opening between said smaller chambers whereby restricted airflow between said smaller chambers occurs in dependence of pressure differences between said smaller chambers, and means connected with both of said diaphragms to respond to the difference of the forces acting thereon.

2. Apparatus responsive to the rate of flow of an air stream comprising, in combination, means forming a main chamber having a pair of smaller chambers therewithin, said smaller chambers being connected by a restricted opening affording restricted airflow therebetween, a flexible diaphragm sealing each of said smaller chambers, means for admitting atmospheric pressure to said main chamber, means for applying air at a pressure proportional to the rate of flow of said air stream to one of said smaller chambers, and means connected with both of said diaphragms to respond to the difference of the forces acting thereon.

3. Apparatus responsive to the rate of flow of an air stream comprising, in combination, means forming a pair of chambers interconnected by a restricted opening to permit restricted airflow between the chambers, a flexible diaphragm sealing each chamber, means for applying atmospheric pressure externally of both of said chambers, means for applying air at a pressure proportional to the rate of flow of said air stream internally of one of said chambers, and means connected with both of said diaphragms to respond to the difference of the forces acting thereon.

4. An air speed detector, comprising, in combination, a pair of flexible variable volume chambers interconnected by a restricted opening permitting restricted air flow therebetween, means connected with one of said flexible chambers for applying air under pressure to said one flexible chamber in dependence of the rate of flow of the air, and means connected with both of said flexible chambers to respond to the difference of the displacements thereof.

5. Apparatus responsive to the rate of flow of air comprising, in combination, means forming a pair of flexible variable volume chambers interconnected by a restricted opening permitting restricted air flow therebetween, fluid conducting means connected with one of said flexible chambers and insertable in an air stream for applying air pressure to said one flexible chamber in dependence of the rate of flow of the air, and means connected with both of said flexible chambers to respond to the difference of the displacements thereof.

6. Apparatus responsive to the rate of flow of an air stream comprising, in combination, means forming a main chamber having a pair of smaller chambers therewithin, a flexible diaphragm sealing each of said smaller chambers, means for admitting atmospheric pressure to said main chamber, means for applying air pressure to one of said smaller chambers in dependence of the rate of flow of said air stream, means providing a restricted opening between said smaller chambers whereby restricted airflow between said smaller chambers occurs in dependence of pressure differences between said smaller chambers, lever means connected to both of said flexible diaphragms, and pivot means pivotally mounting said lever means between said flexible diaphragms.

7. Apparatus responsive to the rate of flow of an air stream comprising, in combination, means forming a main chamber having a pair of smaller chambers therewithin, said smaller chambers being connected by an orifice affording restricted airflow therebetween, a flexible diaphragm sealing each of said smaller chambers, means for admitting atmospheric pressure to said main chamber, means for applying air at a pressure proportional to the rate of flow of said air stream to one of said smaller chambers, lever means connected to both of said flexible diaphragms, and pivot means pivotally mounting said lever means between said flexible diaphragms.

8. In a system for controlling the speed of operation of a dirigible craft operable in a fluid medium, said dirigible craft having a speed control device, the combination of, a pair of flexible chambers interconnected by a restricted opening permitting restricted fluid flow therebetween, means for applying fluid to one of said flexible chambers at a pressure in dependence of the relative movement of said dirigible craft and said fluid medium, lever means connected to both of said flexible chambers, pivot means pivotally mounting said lever means between said flexible chambers, means for applying a predetermined torque to said lever means about said pivot means in opposition to the torque applied thereto by said one flexible chamber, and control means responsive to angular movement of said lever means about said pivot means for controlling said speed control device.

9. In a system for controlling the speed of operation of an aircraft having a speed control device, the combination of, means forming a pair of flexible chambers interconnected by a restricted opening permitting restricted airflow therebetween, a movable member, means connecting said movable member to both of said flexible chambers to be biased in opposite directions by deflections thereof, a Pitot tube connected to one of said flexible chambers, means for applying a predetermined force to said movable member in opposition to the force thereon due to said one flexible chamber, and control means responsive to movement of said movable member for controlling said speed control device.

10. In a system responsive to the speed of operation of an aircraft the combination of, means forming a pair of flexible chambers interconnected by a restricted opening permitting restricted airflow therebetween, a movable member, means connecting said movable member to both of said flexible chambers to be biased in opposite directions by deflections thereof, a Pitot tube connected to one of said flexible chambers, electric motor operated means connected to said movable member for applying a biasing force thereto in opposition to the biasing force of said one flexible chamber, and electrical pick-off means responsive to movement of said movable member for energizing said electric motor operated means.

11. Apparatus responsive to the rate of flow of an air stream comprising, in combination, means forming a main chamber having a pair of smaller chambers therewithin, a flexible diaphragm sealing each of said smaller chambers, means for admitting atmospheric pressure to said main chamber, means for applying air pressure to one of said smaller chambers in dependence of the rate of flow of said air stream, means providing a restricted opening between said smaller chambers whereby restricted airflow between said smaller chambers occurs in dependence of pressure differences between said smaller chambers, a movable member connected to both of said flexible diaphragms to be biased in opposite directions of deflections thereof, a Pitot tube connected to one of said smaller chambers, electrically operated means connected to said movable member to apply a biasing force thereto in opposition to the biasing force of the flexible diaphragm of said one smaller chamber, electrical pick-off means responsive to movement of said movable member for energizing said electrically operated means, and switching means for disconnecting said electrical pick-off means from said electrically operated means and connecting said electrical pick-off means to said speed control device.

12. Pressure sensitive apparatus comprising, means forming a pair of flexible chambers interconnected by an orifice permitting restricted fluid flow therebetween, a movable member, means connecting said movable member to both of said flexible chambers to be moved in opposite directions by deflections of said flexible chambers, one flexible chamber having an opening thereinto for admitting a fluid, and means for applying a predetermined force to said movable member in opposition to the force thereon due to said one flexible chamber.

13. Pressure sensitive apparatus comprising, means forming a pair of flexible chambers interconnected by an orifice permitting restricted fluid flow therebetween, a movable member, means connecting said movable member to both of said flexible chambers to be moved in opposite directions by deflections of said flexible chambers, one flexible chamber having an opening thereinto for admitting a fluid, biasing means operatively associated with said movable member for applying force thereto in opposition to the force on said movable member due to said one flexible chamber, and pick-off means responsive to movement of said movable member and connected with said biasing means for controlling said biasing means.

References Cited in the file of this patent

UNITED STATES PATENTS

| Number | Name | Date |
| --- | --- | --- |
| 713,259 | Weston | Nov. 11, 1902 |
| 1,711,066 | Smoot | Apr. 30, 1929 |
| 2,173,810 | Taylor | Sept. 19, 1939 |
| 2,268,285 | Ivanoff | Dec. 30, 1941 |
| 2,320,508 | Burns et al. | June 1, 1943 |
| 2,325,103 | Bristol | July 27, 1943 |
| 2,448,167 | Baak | Aug. 31, 1948 |
| 2,484,451 | Allwein | Oct. 11, 1949 |